United States Patent
McGuffin

(10) Patent No.: US 8,681,019 B2
(45) Date of Patent: Mar. 25, 2014

(54) METHOD FOR AUTOMATIC DELAY OF STANDBY MESSAGE TO MAXIMIZE TIME FOR RESPONSE TO ELECTRONIC TEXT MESSAGE

(75) Inventor: Thomas F. McGuffin, Bellevue, WA (US)

(73) Assignee: Honeywell International Inc., Morristown, NJ (US)

( * ) Notice: Subject to any disclaimer, the term of this patent is extended or adjusted under 35 U.S.C. 154(b) by 1059 days.

(21) Appl. No.: 12/714,875

(22) Filed: Mar. 1, 2010

(65) Prior Publication Data

US 2011/0210870 A1    Sep. 1, 2011

(51) Int. Cl.
G08B 21/00 (2006.01)
G08B 1/00 (2006.01)
H04W 4/00 (2009.01)

(52) U.S. Cl.
USPC .................. 340/945; 340/309.9; 455/431

(58) Field of Classification Search
USPC ................. 340/309.9, 945; 455/431
See application file for complete search history.

(56) References Cited

U.S. PATENT DOCUMENTS

2004/0124998 A1    7/2004  Dame
2008/0163093 A1*   7/2008  Lorido ........................ 715/771
2008/0316057 A1*  12/2008  McGuffin .................... 340/945
2009/0117895 A1    5/2009  McGuffin
2010/0277347 A1*  11/2010  Judd ............................ 340/945

FOREIGN PATENT DOCUMENTS

EP    1923851        5/2008
WO    2006087276     8/2006

OTHER PUBLICATIONS

European Patent Office, "Office Action", "from Foreign Counterpart of U.S. Application", Sep. 27, 2012, pp. 1-10, Published in: EP.
European Patent Office, "Summons to Attend Oral Proceedings", "from Foreign Counterpart of U.S. Appl. No. 12/714,875", Jun. 5, 2013, pp. 1-8, Published in: EP.

* cited by examiner

Primary Examiner — Kent Chang
Assistant Examiner — Chayce Bibbee
(74) Attorney, Agent, or Firm — Fogg & Powers LLC

(57) ABSTRACT

A method for electronic communications comprises transmitting an electronic text message from a sender to a receiver, starting a sender timer when the text message is transmitted that monitors an initial time period to accept a response message from the receiver, and starting a receiver timer when the text message is received that monitors an initial time period to respond. If a STANDBY message is selected after the text message is received, an automatic timing delay is initiated to send the STANDBY message. The STANDBY message is transmitted when the automatic timing delay has reached a predetermined timing threshold. The receiver timer is restarted when the STANDBY message is transmitted to give the receiver an additional time period to respond. The sender timer is restarted when the STANDBY message is received to give the sender an additional time period to accept a response message from the receiver.

20 Claims, 4 Drawing Sheets

METHOD FOR AUTOMATIC DELAY OF STANDBY MESSAGE TO MAXIMIZE TIME FOR RESPONSE TO ELECTRONIC TEXT MESSAGE

BACKGROUND

Air traffic control (ATC) is used at most airports to coordinate general aircraft traffic around the airport and en route. Traditionally, a pilot uses a radio to speak to an ATC center to request permission or to receive instructions therefrom. With increasing air traffic, the volume of voice communication is straining the capacity of the voice network. Consequently, data-link applications have been developed to provide textual communication between pilots and air traffic controllers.

One of these data-link applications, called Controller Pilot Data Link Communication (CPDLC), provides for the direct exchange of text-based messages between a controller and a pilot. The CPDLC application enables the pilot to communicate electronically with an ATC center by guiding the pilot through a series of screen configurations or displays that either elicit flight information from the pilot or notify the pilot regarding flight information. The CPDLC application may be part of a larger flight information/control software program or may serve as a stand-alone program.

The CPDLC protocol as defined in Eurocae document ED110/RTCA doc 280 requires the pilot to respond to each ground message within 100 seconds. If the pilot needs more time to respond, the pilot has to manually send a "STANDBY" message. The pilot then has 100 more seconds to respond from the time the STANDBY message was sent. If the pilot sends the STANDBY message shortly after receiving the ground message (e.g., 20 s), then the amount of time to respond (20 s+100 s=120 s) is not maximized. The pilot can wait and try to send the STANDBY message just before the 100 second time limit of the response timer expires in order to maximize the time to evaluate the message (e.g., 99 s+100 s=199 s). If the pilot waits just a little too long, however, the response timer will expire and the pilot will not be allowed to respond to the ground message. An air traffic controller is in a similar high pressure situation but with a different time limit of 240 seconds to respond to an aircraft message.

SUMMARY

A method for electronic communications comprises transmitting an electronic text message from a sender to a receiver, starting a sender timer when the text message is transmitted that monitors an initial time period to accept a response message from the receiver, and starting a receiver timer when the text message is received that monitors an initial time period to respond. If a STANDBY message is selected after the text message is received, an automatic timing delay is initiated to send the STANDBY message. The STANDBY message is transmitted when the automatic timing delay has reached a predetermined timing threshold. The receiver timer is restarted when the STANDBY message is transmitted to give the receiver an additional time period to respond. The sender timer is restarted when the STANDBY message is received to give the sender an additional time period to accept a response message from the receiver.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

Figure 1:
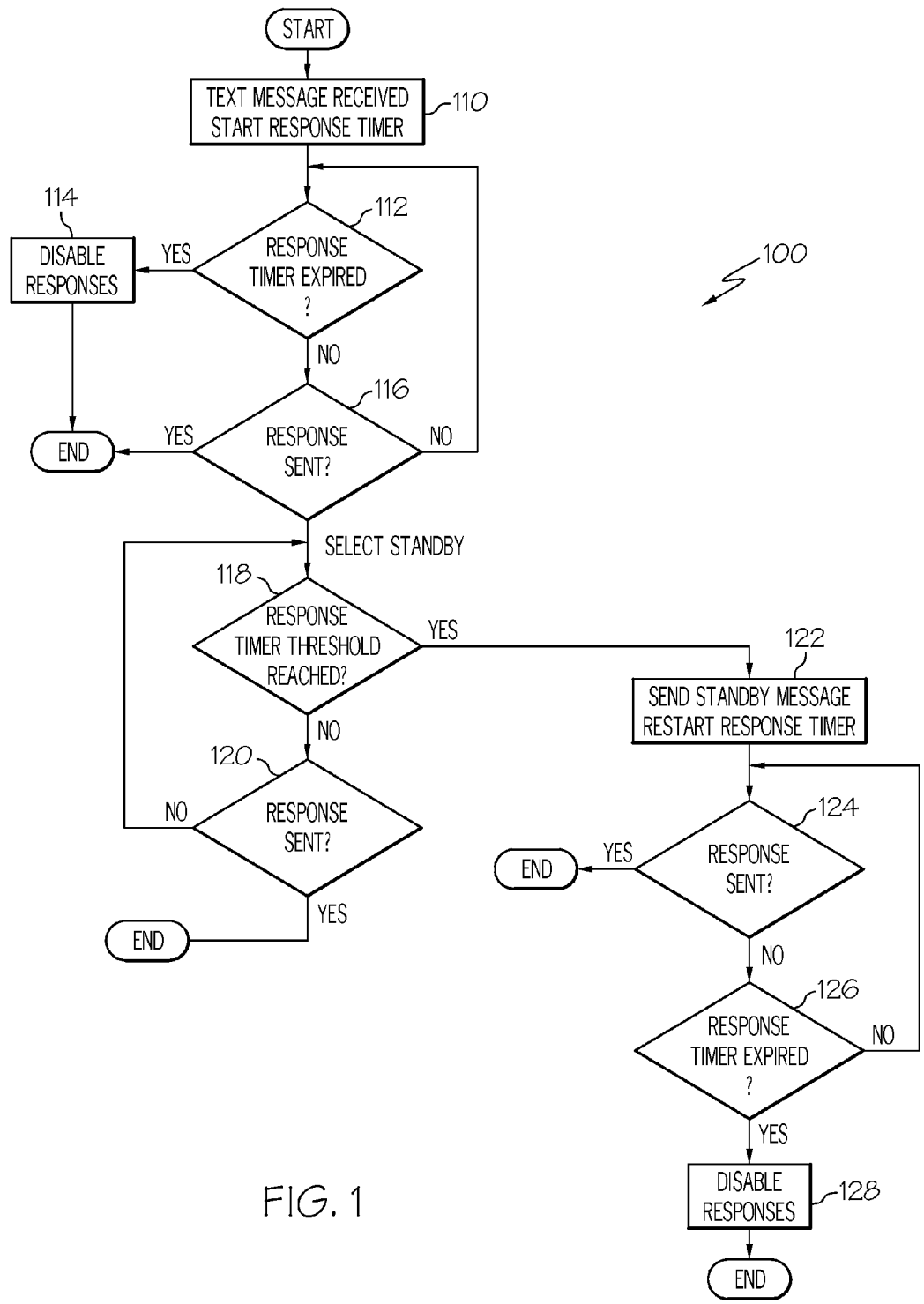
FIG. 1 is a flow diagram representing a method for automatic delay of a STANDBY message.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A method and system for automatic delay of a STANDBY message is provided to maximize the time for responding to an electronic text message, such as a Controller Pilot Data Link Communication (CPDLC) message. The present approach provides for automatic delay in the sending of the STANDBY message, after a STANDBY function is selected by a pilot or air traffic controller, until just before a response timer expires. If the STANDBY message were to be sent right away after selection without delay, the pilot or air traffic controller would not have the maximum time possible to respond to the text message. The present method provides for automatically maximizing the amount of time a pilot or air traffic controller has to respond to an incoming text message after the STANDBY message is selected. This aids in reducing pilot and air traffic controller workload during high pressure situations.

In one approach, the present method can be implemented by a software protocol run on an avionics computer. In this implementation, when the pilot selects the STANDBY function after receiving an incoming text message, the computer automatically delays sending the STANDBY message a predetermined amount of time. The present method can also be implemented by a software protocol run on an air traffic control computer. In such an implementation, when the air traffic controller selects the STANDBY function after receiving an incoming text message, the computer automatically delays sending the STANDBY message a predetermined amount of time.

The amount of delay time in sending the STANDBY message can be configured as a function of the current network propagation delay. For example, in one implementation, if the network propagation is low (e.g., round trip message time less than about 10 s), then the transmission of the STANDBY message is delayed until about 90% of the response time has elapsed. If the network propagation is medium (e.g., round trip message time from about 10-20 s), then the transmission of the STANDBY message is delayed until about 80% of the response time has elapsed. If the network propagation is high (e.g., round trip message time greater than about 20 s), then the transmission of the STANDBY message is delayed until about 70% of the response time has elapsed.

The present method can be implemented for an aircraft by modifying conventional avionics software to add logic steps to automatically delay sending of a STANDBY message for a predetermined amount of time after being selected in response to an uplink text message from an Air Traffic Control (ATC) center on the ground. Likewise, the present method can be implemented for an ATC system on the ground by modifying air traffic controller workstation software to add logic steps to automatically delay sending of a STANDBY message for a predetermined amount of time after being selected in response to a downlink text message from an aircraft.

The present method can be implemented as part of the CPDLC software in an air traffic control computer; in a communication management function (CMF) or a communication management unit (CMU); in a flight management computer (FMC) such as an FMC hosting CPDLC applications; or in any other avionics computer in an aircraft. The present method can be a part of the communication protocols for future air navigation system (FANS) CPDLC systems, or aeronautical telecommunication network (ATN) CPDLC systems.

It should be noted that the avionics and ground implementations of the present method utilize the same unique features but are independent of each other. Hence, the present method can function even if only one of an avionics computer or ATC computer are programmed with software protocols to automatically delay sending of a STANDBY message.

Further details of the present method and system are described hereafter with reference to the drawings.

FIG. 1 represents a method 100 for automatic delay of a STANDBY message according to one approach. The method 100 starts when an electronic text message, such as a CPDLC message, is received by a pilot or an air traffic controller and a response timer is started (block 110). A determination is then made whether the response timer has expired (block 112). If the response timer has expired, the response capability is disabled (block 114) and the method ends. If the response timer has not expired, a determination is made whether the pilot/controller has sent a response message (block 116). If the response message has been sent, the method ends. If the response message has not been sent, method 100 continues to monitor whether the response timer has expired (block 112) and whether the pilot/controller has sent a response message (block 116). During this period, if the STANDBY function is selected, a determination is made whether the response timer has reached a predetermined timing threshold (e.g., 90% of time elapsed) (block 118). If not, a determination is made whether a pilot/controller response message has been sent (block 120). If the response message has been sent, the method ends. If the response message has not been sent, method 100 continues to monitor whether the response timer has reached the predetermined timing threshold (block 118) and whether a pilot/controller response message has been sent (block 120). During this period, if the response timer has reached the predetermined timing threshold without a response message being sent, a STANDBY message is sent and the response timer is restarted (block 122).

Once the STANDBY message is sent, method 100 monitors whether the pilot/controller has sent a response message (block 124). If the response message has been sent, the method ends. If the response message has not been sent, a determination is made whether the response timer has expired (block 126). If the response timer has expired, the response capability is disabled (block 128) and the method ends. If the response timer has not expired, the method continues to monitor whether a pilot/controller response message has been sent (block 124) and whether the response timer has expired (block 126), until the response message is sent or the response timer expires.

Figure 2:
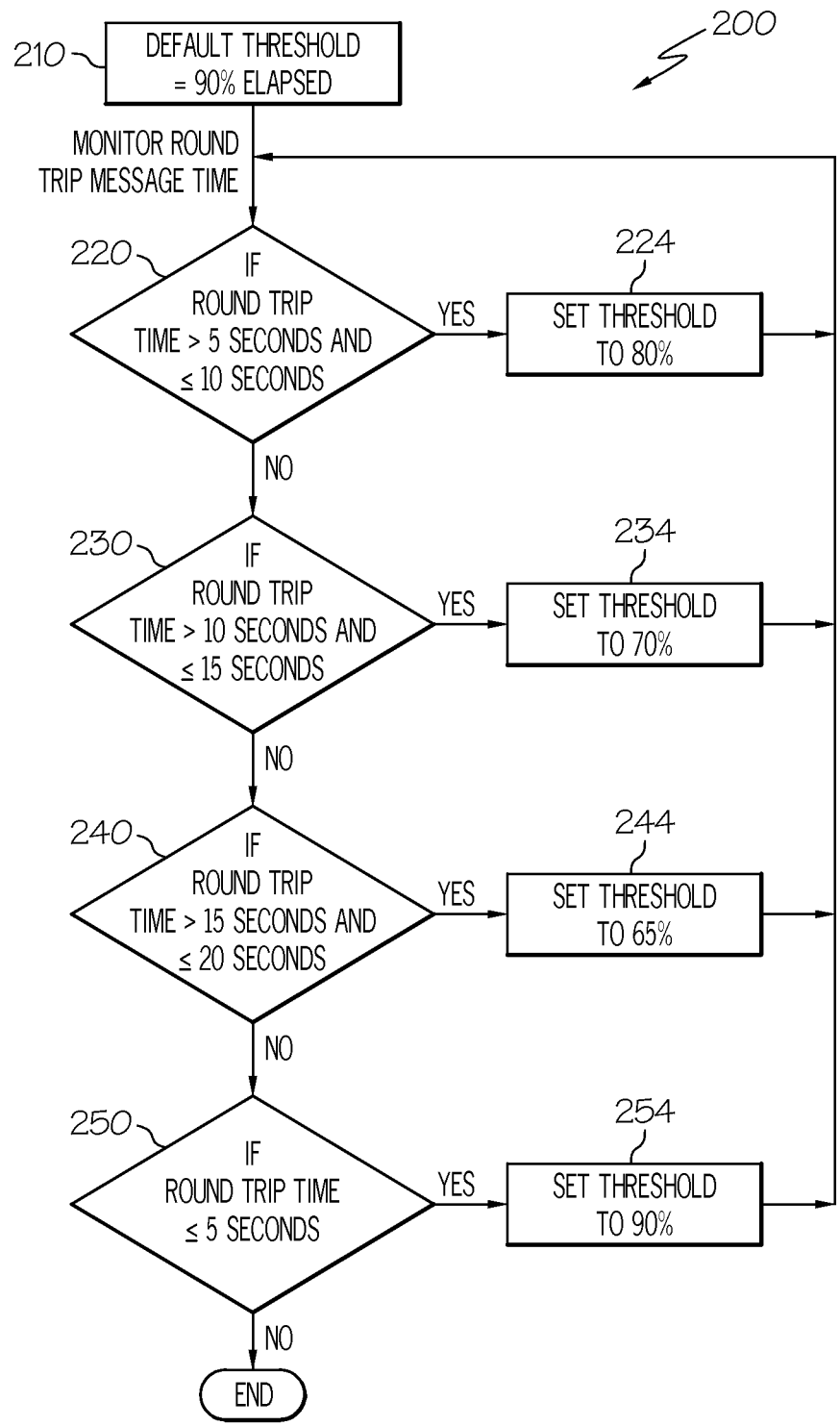
FIG. 2 is a flow diagram representing a method for varying a timing threshold for use in the method for automatic delay of a STANDBY message as shown in FIG. 1.

The predetermined timing threshold utilized in method 100 can be automatically varied as a function of network performance such as network response time. FIG. 2 represents an exemplary method 200 for automatically varying a default timing threshold for sending the STANDBY message, based on the timing of a round trip message between a sender computer and a receiver computer. The round trip message time is the difference between the time of message transmission and the time of response message reception. In general, as network signal propagation delays become greater, the default timing threshold is automatically reduced so that the STANDBY message is transmitted earlier.

As shown in exemplary method 200 of FIG. 2, a timing threshold having a default value of about 90% time elapsed is set (block 210), and a round trip message time is monitored. A determination is made whether the round trip message time is within a first range, such as from greater than about 5 s up to about 10 s (block 220). If yes, the threshold is set to a first value that is less than the default value, such as about 80% time elapsed (block 224), and the method continues to monitor the round trip message time. If the round trip message time is not within the first range, a determination is made whether the round trip message time is within a second range, such as from greater than about 10 seconds up to about 15 seconds (block 230). If yes, then the threshold is set to a second value that is less than the first value, such as about 70% time elapsed (block 234), and the method continues to monitor the round trip message time. If the round trip message time is not within the second range, a determination is made whether the round trip message time is within a third range, such as from greater than about 15 seconds up to about 20 seconds (block 240). If yes, then the threshold is set to a third value that is less than the second value, such as about 65% time elapsed (block 244), and the method continues to monitor the round trip message time. If the round trip message time is not within the third range, a determination is made whether the round trip message time is within a fourth range, such as about 5 seconds or less (block 250). If yes, then the threshold is set back to the default value such as about 90% (block 254), and the method continues to monitor the round trip message time. If the round trip message time is not within any of the foregoing decision blocks (e.g., greater than about 20 seconds), the method 200 ends and other message timing controls in the computer take over.

Figure 3:
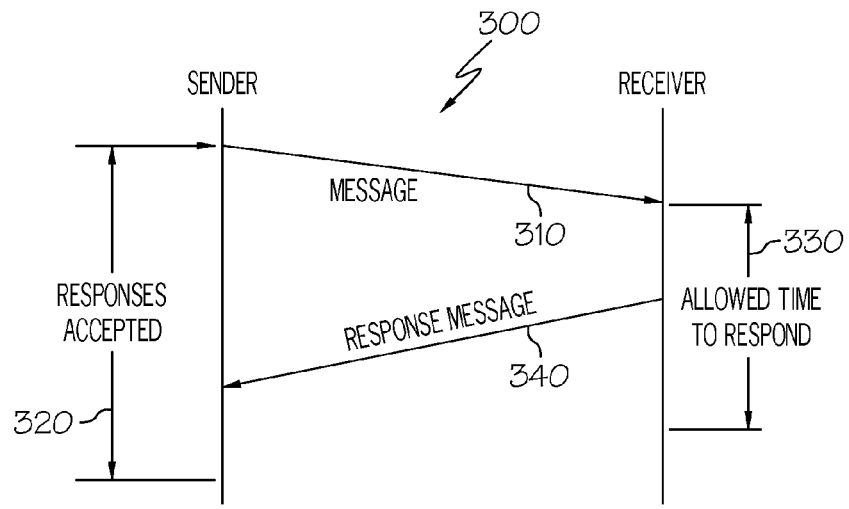
FIG. 3 is a timing diagram for a conventional communication method between a sender and a receiver that does not use a STANDBY message.

FIG. 3 is a timing diagram for a conventional communication method 300 between a sender (air traffic controller or pilot) and a receiver (pilot or air traffic controller) that does not use a STANDBY message response. When a message 310 is transmitted by the sender, a sender timer is started that monitors a time period to accept responses 320. The receipt of message 310 by the receiver starts a receiver timer that monitors an allowed time period to respond 330. A response message 340 needs to be sent back to the sender by the receiver before the time period to respond 330 expires or the response capability will be disabled. The response message 340 needs to be received by the sender before the time period to accept responses 320 expires or the response message will not be accepted by the sender computer.

Figure 4:
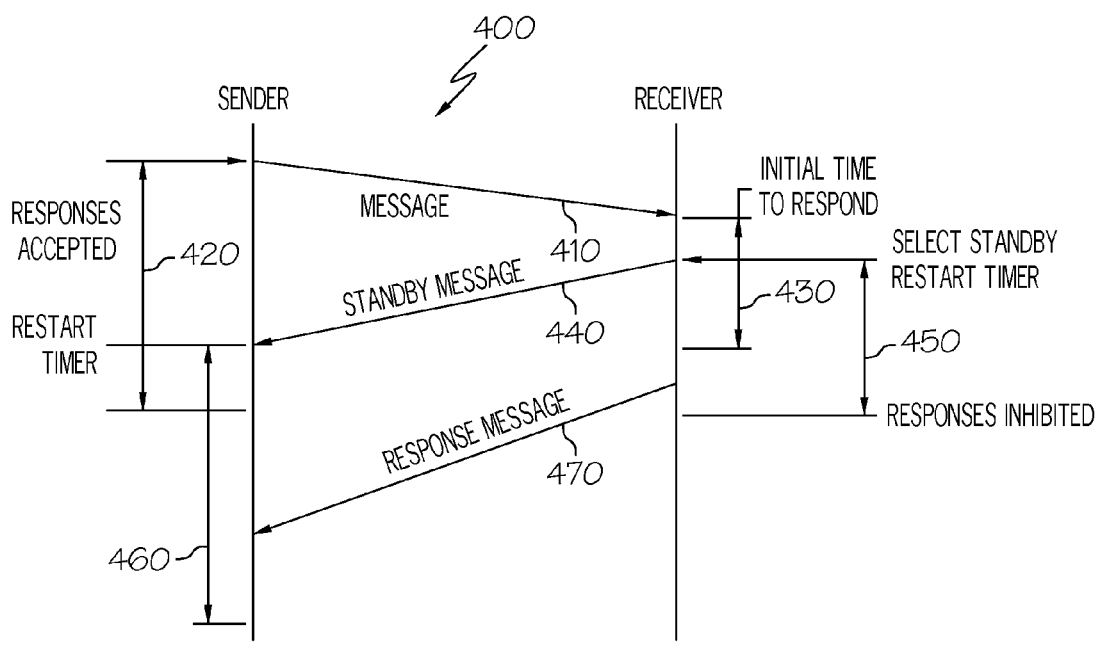
FIG. 4 is a timing diagram for a conventional communication method between a sender and a receiver that uses a STANDBY message.

FIG. 4 is a timing diagram for a conventional communication method 400 between a sender and a receiver that utilizes a STANDBY message response. When a message 410 is transmitted by the sender, a sender timer is started that monitors a time period to accept responses 420. The receipt of message 410 by the receiver starts a receiver timer that monitors an initial time period to respond 430. When the receiver selects the STANDBY function, a STANDBY message 440 is sent, and the receiver timer is restarted to give the receiver an additional time period to respond 450. When the STANDBY message 440 is received by the sender, the sender timer is restarted to give the sender an additional time period to accept responses 460. A response message 470 needs to be sent back to the sender by the receiver before the additional time period to respond 450 expires or any subsequent response message will be inhibited from being sent. The response message 470 needs to be received by the sender before the additional time period to accept responses 460 expires or the response message will not be accepted by the sender computer.

Figure 5:
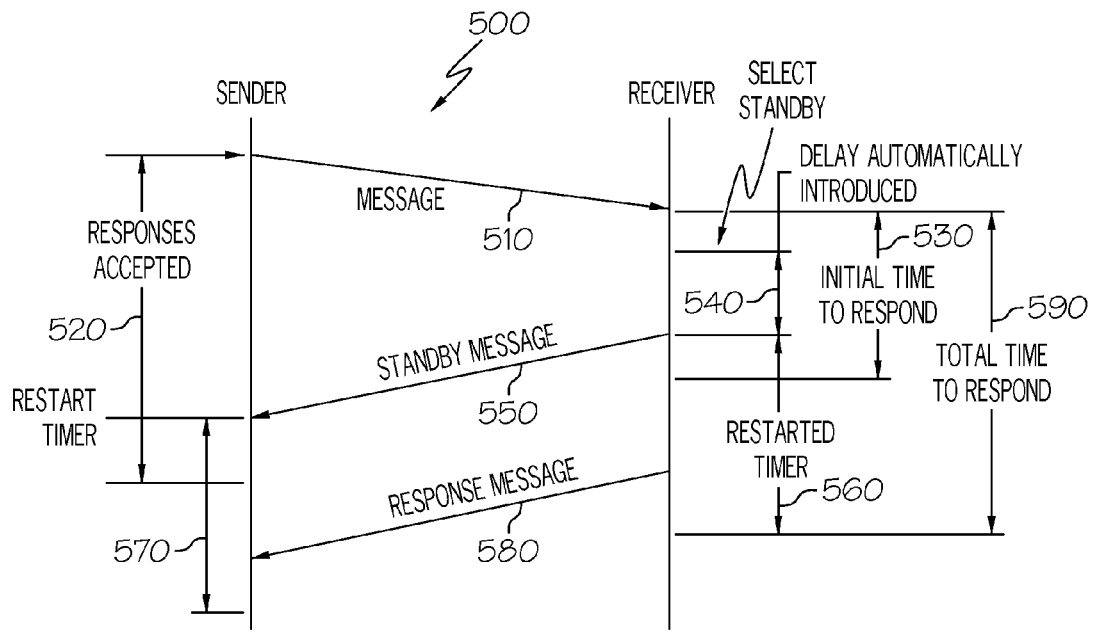
FIG. 5 is a timing diagram for a communication method between a sender and a receiver that uses a STANDBY message with automatic delay.

FIG. 5 is a timing diagram for a communication method 500 between a sender and a receiver that uses a STANDBY message response with automatic delay according to the present approach. When a message 510 is transmitted by the sender, a sender timer is started that monitors a time period to accept responses 520. The receipt of message 510 by the receiver starts a receiver timer that monitors an initial time period to respond 530. When the receiver selects the STANDBY function, a timing delay 540 is automatically introduced to maximize the total time available for response. After the timing delay has expired, a STANDBY message 550 is sent, and the receiver timer is restarted to give the receiver an additional time period to respond 560. When the STANDBY message 550 is received by the sender, the sender timer is restarted to give the sender an additional time period to accept responses 570. A response message 580 needs to be sent back to the sender by the receiver before the additional time period to respond 560 expires or any subsequent response message will not be sent. The response message 580 needs to be received by the sender before the additional time period to accept responses 570 expires or the response message will not be accepted by the sender computer. As shown in FIG. 5, a total time to respond 590 is increased from the initial time period to respond 530 because of the automatic delay in sending the STANDBY message 550.

Figure 6:
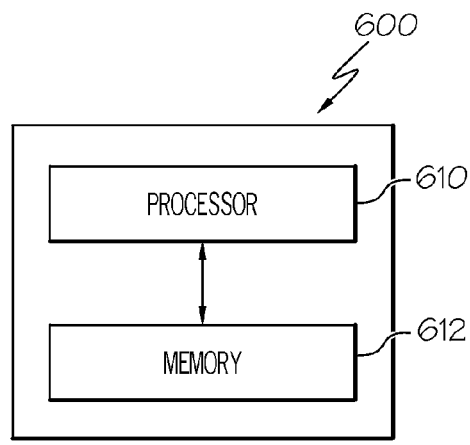
FIG. 6 is a block diagram of a computer system configured to implement a method for automatic delay of a STANDBY message according to one embodiment.

FIG. 6 depicts a computer system 600 configured to implement the present method. The computer system 600 includes at least one processor 610, and at least one memory device 612 in operative communication with processor 610. The processor 610 can include one or more microprocessors, memory elements, digital signal processing (DSP) elements, interface cards, and other standard components known in the art. Any of the foregoing may be supplemented by, or incorporated in, specially-designed application-specific integrated circuits (ASICs) or field programmable gate arrays (FPGAs).

The memory device 612 contains computer readable instructions for carrying out the various process tasks, calculations, and generation of signals and other data used in the operation of the method of the invention. These instructions can be implemented in software, firmware, or other computer readable instructions. The memory device 612 may be any appropriate computer program product such as a computer readable medium used for storage of computer readable instructions. Such readable instructions can be in the form of program modules or applications, data components, data structures, algorithms, and the like, which perform particular tasks or implement particular abstract data types. The computer readable medium can be selected from any available computer readable media that can be accessed by a general purpose or special purpose computer or processor, or any programmable logic device.

Suitable computer readable media may comprise, for example, non-volatile memory devices including semiconductor memory devices such as EPROM, EEPROM, or flash memory devices; magnetic disks such as internal hard disks or removable disks; magneto-optical disks; CDs, DVDs, or other optical storage disks; nonvolatile ROM, RAM, and other like media; or any other media that can be used to store desired program code in the form of computer executable instructions.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for electronic communications, the method comprising:
    transmitting an electronic text message from a sender to a receiver;
    starting a sender timer when the text message is transmitted that monitors an initial time period to accept a response message from the receiver;
    starting a receiver timer when the text message is received that monitors an initial time period to respond;
    if a standby function is manually selected after the text message is received, initiating an automatic timing delay to send a standby message;
    transmitting the standby message when the automatic timing delay has reached a predetermined timing threshold;
    restarting the receiver timer when the standby message is transmitted to give the receiver an additional time period to respond; and
    restarting the sender timer when the standby message is received to give the sender an additional time period to accept a response message from the receiver.

2. The method of claim 1, wherein the sender is an air traffic controller or a pilot.

3. The method of claim 2, wherein the receiver is an air traffic controller when the sender is a pilot.

4. The method of claim 2, wherein the receiver is a pilot when the sender is an air traffic controller.

5. The method of claim 1, wherein the electronic text message is a controller pilot data link communication message.

6. The method of claim 1, wherein if a response message is not sent to the sender by the receiver before the additional time period to respond expires, any subsequent response message is disabled.

7. The method of claim 1, wherein if a response message is not received by the sender before the additional time period to accept a response message expires, the response message will not be accepted.

8. A method for electronic communications in a network, the method comprising:
    (a) receiving an electronic text message;
    (b) starting a response timer;
    (c) monitoring whether the response timer has expired;
    (d) if the response timer has not expired, determining whether a response message has been transmitted;

(e) if a response message has not been transmitted, repeating (c) and (d) until a standby function is manually selected that initiates an automatic timing delay in sending a standby message;
(f) when the standby function is selected, determining whether the response timer has reached a predetermined timing threshold;
(g) if the response timer has not reached the predetermined timing threshold, determining whether a response message has been transmitted;
(h) if the response message has not been transmitted, repeating (f) and (g) until the predetermined timing threshold is reached or the response message is transmitted;
(i) if the response timer has reached the predetermined timing threshold, transmitting the standby message and restarting the response timer;
(j) monitoring whether a response message has been transmitted;
(k) if a response message has not been transmitted, determining whether the response timer has expired;
(l) if the response timer has not expired, repeating (j) and (k) until the response message is transmitted or the response timer has expired; and
(m) if the response timer has expired without the response message being transmitted, disabling any subsequent response message from being transmitted.

9. The method of claim 8, wherein the electronic text message is received by a pilot or an air traffic controller.

10. The method of claim 8, wherein the predetermined timing threshold is automatically varied as a function of network performance.

11. The method of claim 8, wherein the predetermined timing threshold is automatically varied based on a round trip message time between a sender computer and a receiver computer.

12. The method of claim 11, wherein the round trip message time is calculated as a difference between a message transmission time and a time of reception of a response message.

13. The method of claim 8, further comprising:
setting a default value for the predetermined timing threshold;
montioring a round trip message time;
determining whether the round trip message time is within a first range;
if the round trip message time is within the first range, setting the predetermined timing threshold to a first value that is less than the default value, and continue monitoring the round trip message time;
if the round trip message time is not within the first range, determining whether the round trip message time is within a second range;
if the round trip message time is within the second range, setting the timing threshold to a second value that is less than the first value, and continue monitoring the round trip message time;
if the round trip message time is not within the second range, determining whether the round trip message time is within a third range;
if the round trip message time is within the third range, setting the timing threshold to a third value that is less than the second value, and continue monitoring the round trip message time;
if the round trip message time is not within the third range, determining whether the round trip message time is within a fourth range; and
if the round trip message time is within the fourth range, setting the timing threshold to the default value, and continue monitoring the round trip message time.

14. The method of claim 8, wherein the method is implemented as part of communication protocols for a future air navigation controller pilot data link communication (CPDLC) system.

15. The method of claim 8, wherein the method is implemented as part of communication protocols for an aeronautical telecommunication network CPDLC system.

16. A computer system, comprising:
at least one processor; and
at least one memory device operatively coupled to the processor, the memory device comprising a computer readable medium having instructions stored thereon executable by the processor to carry out the method of claim 8.

17. The computer system of claim 16, wherein the computer system comprises a communication management function, a communication management unit, a flight management computer, or an air traffic control computer.

18. A computer program product, comprising:
a computer readable medium having instructions stored thereon executable by a processor to carry out the method of claim 8.

19. A system for electronic communications, the system comprising:
at least one processor; and
at least one memory device operatively coupled to the processor, the memory device comprising a computer readable medium having instructions stored thereon executable by the processor to carry out a method for automatic delay of a standby message, the method comprising:
(a) receiving a controller pilot data link communication (CPDLC) message;
(b) starting a response timer;
(c) monitoring whether the response timer has expired;
(d) if the response timer has not expired, determining whether a response message has been transmitted;
(e) if a response message has not been transmitted, repeating (c) and (d) until a standby function is manually selected that initiates an automatic timing delay in sending a standby message;
(f) when the standby function is selected, determining whether the response timer has reached a predetermined timing threshold, wherein the predetermined timing threshold is automatically varied as a function of network performance;
(g) if the response timer has not reached the predetermined timing threshold, determining whether a response message has been transmitted;
(h) if the response message has not been transmitted, repeating (f) and (g) until the predetermined timing threshold is reached or the response message is transmitted;
(i) if the response timer has reached the predetermined timing threshold, transmitting the standby message and restarting the response timer;
(j) monitoring whether a response message has been transmitted;
(k) if a response message has not been transmitted, determining whether the response timer has expired;
(l) if the response timer has not expired, repeating (j) and (k) until the response message is transmitted or the response timer has expired; and (m) if the response timer has expired without the response message being transmitted, disabling any subsequent response message from being transmitted.

20. The system of claim 19, wherein the system is implemented as part of a future air navigation CPDLC system, or an aeronautical telecommunication network CPDLC system.

* * * * *